United States Patent [19]

Kanegae

[11] Patent Number: 5,307,940
[45] Date of Patent: May 3, 1994

[54] DEVICE FOR TRIMMING TOO LONG STICKS AND FOR ELIMINATING THOSE TOO SHORT

[75] Inventor: Yoshifumi Kanegae, Amagasaki, Japan

[73] Assignee: Ezaki Glico Kabushiki Kaisha, Osaka, Japan

[21] Appl. No.: 863,406

[22] Filed: Apr. 3, 1992

[30] Foreign Application Priority Data

Sep. 13, 1991 [JP] Japan .................. 3-262848

[51] Int. Cl.⁵ .................. B07C 5/14; B23D 21/00
[52] U.S. Cl. .................. 209/517; 83/409.1; 99/643; 426/503
[58] Field of Search ............ 83/98, 155.1, 162, 409.1, 83/932; 99/537, 635, 643; 198/456, 836.1; 426/503; 209/517, 518, 912

[56] References Cited

U.S. PATENT DOCUMENTS

| | | | |
|---|---|---|---|
| 2,649,055 | 8/1953 | Barrelli | 83/932 X |
| 2,801,662 | 8/1957 | Brunnier | 99/643 |
| 2,969,866 | 1/1961 | Musgrave | 99/635 X |
| 3,738,258 | 6/1973 | Goodale | 83/409.1 X |
| 3,764,717 | 10/1973 | Rood | 83/409.1 X |
| 4,919,273 | 4/1990 | Krint et al. | 209/517 |

FOREIGN PATENT DOCUMENTS

| | | | |
|---|---|---|---|
| 574298 | 6/1988 | Australia | |
| 0455514A | 11/1991 | European Pat. Off. | |
| 3-221176 | 9/1991 | Japan | 99/643 |
| 900055512 | 2/1992 | Japan | |

Primary Examiner—D. Glenn Dayoan
Assistant Examiner—Tuan N. Nguyen
Attorney, Agent, or Firm—Moonray Kojima

[57] ABSTRACT

In order to convey thin, long and relatively fragile sticks one after another successively in which those too long are trimmed short and those too short are eliminated so that sticks substantially uniform in length can be conveyed to the next step without fail in:

(1) a device having an endless belt or the like with a multiplicity of grooves capable of accommodating the stick but shorter than the stick and perpendicular to the belt's advancing direction, a guide having introducer after where the stick is fed and a limiter or an opposed guide opposite to the guide;

(2) a device having the aforementioned belt or the like, guide, limiter or opposed guide and a guide plate disposed in front thereof apart from or in contact with the limiter or the opposed guide; and (3) a device having the aforementioned belt or the like, guide, opposed guide, deterrent plate above the guide, horizontal air blow near the last end of the guide and a pressing member behind the horizontal air blow at a position opposite thereto.

8 Claims, 4 Drawing Sheets

DEVICE FOR TRIMMING TOO LONG STICKS AND FOR ELIMINATING THOSE TOO SHORT

FIELD OF THE INVENTION

The present invention relates to a device for conveying sticks relatively brittle like sticklike biscuits successively one after another as they are moved to the next step, trimming those too long and eliminating those too short so as to be approximately equal in length.

PRIOR ARTS AND PROBLEMS TO BE SOLVED BY THE INVENTION

Similar devices for selecting and feeding those in a given range of length from a multiplicity of sticks ununiform in length are supposed to be known in the field of manufacture of precision parts.

The sticks to be trimmed or eliminated according to the present invention are something like biscuits somewhat different in shape, brittle and incidentally cheap. As to the length of such sticks, too high precision is not required. Adoption of some of the known like devices as mentioned above, therefore, means increase in manufacturing cost and decrease in productivity.

Hence, there has been a strong desire for development of a device suited for the physical properties of such as biscuits which are trimmed or eliminated at a high specific rate, being low in hardware cost as well as running cost.

MEANS FOR SOLVING THE PROBLEMS

The material of sticks trimmed or eliminated according to the method of the present invention is high in brittleness, easily broken when subjected to an external force such as biscuit, pretzel, cracker, rice cake or the like. As to its shape, there is no limitation if it is thin and sticklike but preferred is 50-200 mm in length and 2-10 mm in thickness. There is no particular limitation with regard to the sectional shape of such sticks.

Belt or the like referred to in the present invention may, for instance, be a loop of belt used in a belt conveyor, or a loop of chain in a chain conveyor with or without part/s attached thereto.

In case of a belt conveyor grooves may be formed in the belt itself and in case of a chain conveyor it may as well be formed by the use of parts having grooves or made up of parts forming grooves when they are attached or assembled.

Normally a multiplicity of grooves are provided equidistant and perpendicular to the advancing direction of the belt or the like.

The grooves are to be dimensioned so that they well match the dimensions of the sticks to well accommodate them and allow them to displace to some extent within the individual grooves.

Each groove is required to be shorter than the stick to be accommodated so that either or both end/s of the stick project/s ensuring against placing nothing other than the accommodated stick above or below or beyond either end of the groove.

A guide is formed of only an introducer inclined against the belt or the like or having the introducer and main plate bonded or integrated together, the rear end or the end nearer to the belt or the like of the main plate being set parallel to the belt or the like. The introducer is a plate set to approach the belt or the like slantwise so that the sticks can be aligned along the center line of the belt or the like. The portions of the guide near the outlet portions (nozzles) of a horizontal air blow provided at a rear end outside of the guide are to be notched all over or where corresponding to its air passages.

The limiter is to be set to face the guide with the belt and the like in between. The distance between the guides and the limiter are to be made substantially equal to the desired length of the stick so that anything longer than that is arrested thereby. There is no limitation about the shape and dimensions of the limiter and as its examples may be cited objects sticklike, edge-like, plate-like or the like. The limiter is to be positioned at the same phase as the guide or a little behind it.

In this application the state of being opposed each other with a belt or the like in between is to be called simply as being opposed each other. The position in a reverse direction of advance along the advancing direction of the belt or the like is to be called forward, while the position in a direction of advance is to be called rearward.

The opposed guides are to be positioned at the opposed positions to the guide with a belt of the like in between and at the same phase or a little behind that. Their shape may be, but not necessarily be, symmetrical to that of the guide and may, for example, be a plate fixed parallel to the belt or the like at a given distance therefrom.

The distance between the guide and the opposed guide is made a little more than the given dimension of the stick so that anything larger than that cannot pass through them.

In the forward of the limiter or the opposed guides there is provided a guide plate as necessary. The guide plate, which has the same function as the introducer and is for truing up the arriving sticks markedly off the groove along the central zone of the belt and the like, can have its structure similar to that of the introducer, and this may be set off or in contact with or monobloc with the limiter or the opposed guides.

In a region from where the opposed guides are fixed until where the pressing member is disposed there is provided a plate fixed parallel to the belt or the like in a manner to cover one end of the stick from above with a small distance therebetween and this is called the deterrent plate.

A horizontal air blow is so arranged that the air gushing out there hits horizontally the end portion directly or through the notches provided in the rear half section of the main plate, allowing the other end of the stick to slide into contact with the opposed guides.

The pressing member is provided further rearward behind the horizontal air blow and above between the opposed guides and the groove so that one end of the stick can be pressed downward. The pressing force is required to be of such a degree that one end thereof can be pressed down without risk of being broken with the fragility of the stick taken into consideration. For this reason used as the pressing member is a flexible spatula, a plate supported by a spring or an air blow. A brush or a sponge member may also be used, and it may as well be kept revolving.

ACTION

The way and the action the device of the present invention comprising the aforementioned structural elements is used is as described below.

First, the sticks are fed into the grooves formed in the belt or the like by the use of a normally used feeder. In this case it is convenient to have the sticks fed toward the side of the grooves nearer to the guide. Or, there is feasible an alternative, in which the sticks having been fed randomly in the grooves are moved toward the guide by means of the guide plate positioned on the side opposed to the guide before the fed sticks are led to the introducer.

The sticks moving on a conveyor come into contact with the introducer and move toward the opposed guide gradually in the grooves according to the inclination thereof.

The sticks longer than the given limit are caused to hit against the limiter or the opposed guide, are subjected to the lateral pressure both at the end of the groove and the limiter and the end portion of the stick is mostly snapped off in the vicinity of the end of groove, resulting in a smaller dimension. When the top end of the limiter is formed as an edge, it is of course possible that cutting is effected thereby. Anyway, the sticks made shorter thereby continue moving forward and the snapped chips are recovered below.

Since the sticks having moved forward for a while are caused to slide into the grooves by the air gushing out of the horizontal air blow until they are caused to hit against the opposed guides, this means that the sticks have one ends thereof arranged on the opposed guide side. As a result, the other ends thereof are caused not to project within the region of the deterrent plate if the dimension should be less than the set limit.

Since the sticks are conveyed to where the pressing member is present under such conditions and the portion of the sticks near to the opposed guide are strongly pressed down, those whose lengths are within the set limits are prevented from coming off the grooves and jumping up by deterrent plate, while those whose lengths are less than the set limit jump up and fall down.

It is, however, possible to refill the vacant grooves by some of the known methods. For instance, there is a known feeder with which vacant grooves can be detected by means of photoelectric tube to be refilled individually.

BRIEF DESCRIPTION OF THE DRAWINGS

These and other objects and features for the present invention will become apparent from the following description taken in conjunction with the preferred embodiment thereof with reference to the accompanying drawings, in which.

EMBODIMENT 1

Figure 1:
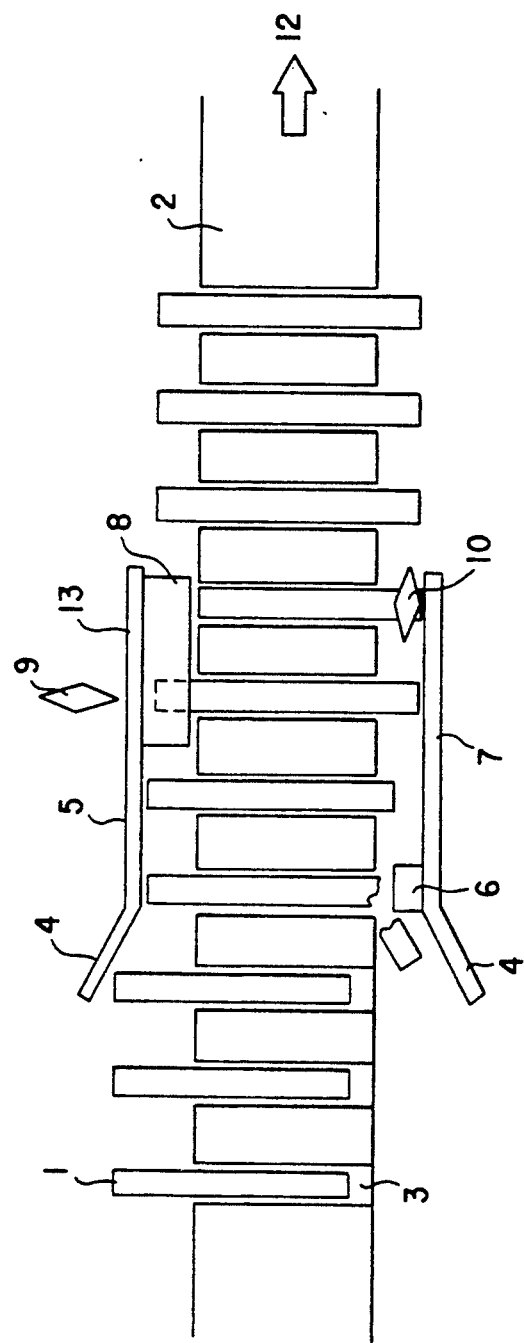
FIG. 1 is a principal plan view of an embodiment of the present invention.
Figure 2:
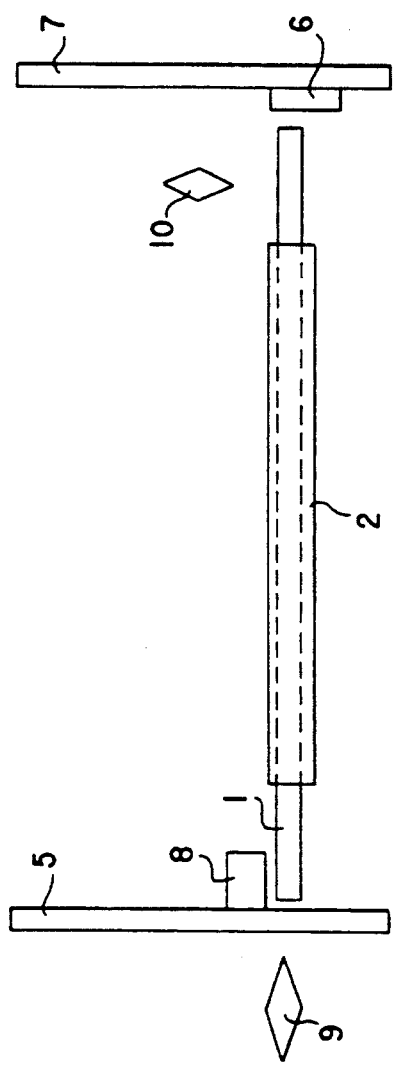
FIG. 2 is a principal side view of an embodiment of the present invention.

This embodiment will be described below in detail with reference to FIGS. 1, 2 and 3.

A stick 1 is a pretzel about 120 mm in length, about 4.5 mm in thickness and about 1.2 g in weight.

A conveyor 12 comprises two rolls 14 and one endless belt 2.

The endless belt 2 tightly put on two rolls 14 has one end thereof 14 driven positively. The forward moving section 11 of the belt 2 accommodating the sticks in grooves 3 formed therein is level. The endless belt 2 is 100 mm wide and about 1 m long, and is made of hard rubber.

Grooves 3 are provided equidistantly and perpendiculary to the advancing direction of the belt 2. Sectional view of the groove is of a square, being 5 mm in width, 5 mm in depth and 20 mm in distance.

Figure 3:
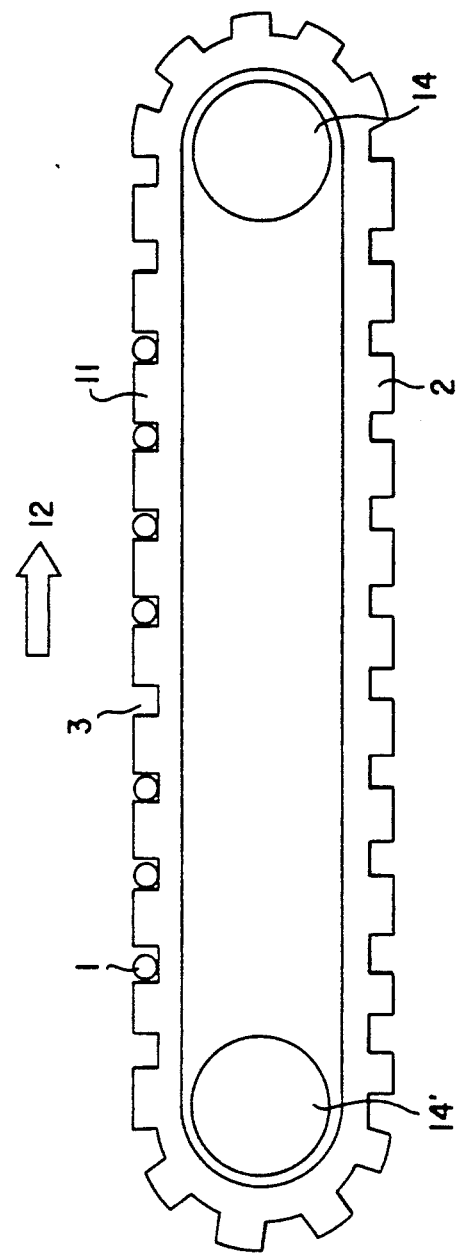
FIG. 3 is a principal sectional view of an embodiment of the present invention.

The endless belt shown in FIG. 3 is driven clockwise at a speed of about 100 mm/second.

A guide 5 is disposed on one side of the forward-moving section 11 of the endless belt 2 and is made up of an introducer 4 and a main plate 13, the latter behind the former with respect to the advancing direction of the belt 2 and formed to be monobloc. At the other end of the belt's forward-moving section 11 the introducer 4, limiter 6 and opposed guide 7 are arranged also to be monobloc. The opposed guide 7 is parallel with the belt 2.

The introducer 4 is a flat plate gradually approaching the belt's forward-moving section 11 in its forward direction. It is in contact with the guide's main plate 13. The angle between the two plates is approximately 120 degrees. The guide's main plate 13 is in parallel with the belt's advancing direction. The distance between the belt's forward-moving section 11 and the guide 5 or the opposed guide 7 is 20 mm respectively. And the lengths of the guide 5 and the opposed guide 7 are 200 mm respectively, and these are both made of stainless steel.

The limiter 6 is a flat plate in contact with the front edge of the opposed guide 7 and extended close to the end of the belt's forward-moving section. The limiter is 15 mm in length and is made of stainless steel.

A deterrent plate 8, too, is a flat plate disposed above the belt's forward-moving section 11 and in contact with the topside of the main plate 13. The length of the deterrent plate is 25 mm and the distance from its underside to the belt's forward-moving section 11 is 10 mm. The material of this plate is stainless steel.

A horizontal air blow 9 is disposed about the center of the main plate 13 and the air gushing out there is perpendicular to the belt's advancing direction 12 so that stick 1, below plate 8, is moved to be against guide 7, to prepare the stick for removal from the groove by the vertical air blow 10.

In order to let air gushing out through the horizontal air blow 9 introduce to the position of belt there are provided holes (not shown) in the corresponding parts of the guide 5. The intensity of the air current is approximately 1 kg/cm2.

A vertical air blow 10 is disposed in the vicinity of the rear end of the opposed guide 7 above and between the opposed guide 7 and the end of the belt's forward-moving section 11. The intensity of this air current which blows downwardly, too, is approximately 1 kg/cm2. Air blow 10 moves downward the stick 1 end to remove the stick from the groove 3.

When the device described above is used, there remain in the grooves only sticks shorter than the distance between the main plate 13 and the limiter 6 and longer than the distance between the opposed guide 7 and the deterrent plate 8.

EMBODIMENT 2

Figure 4:
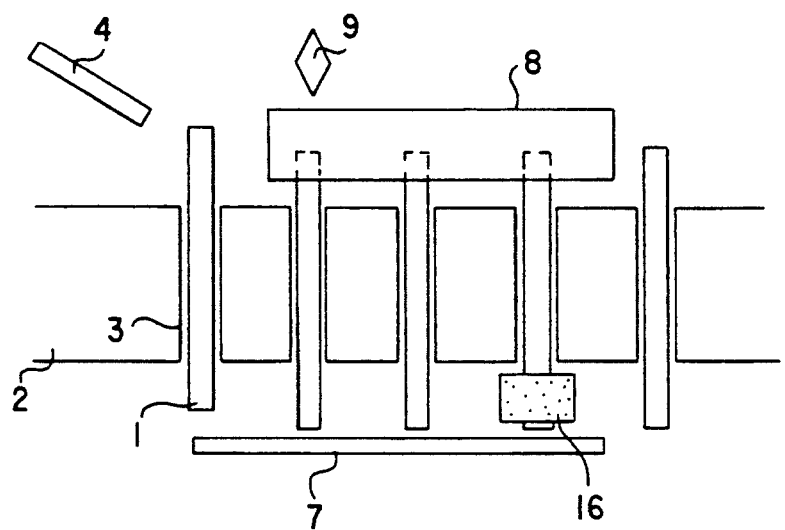
FIG. 4 is a principal plan view of the embodiments shown in the above views except FIG. 1.

In this embodiment the guide is composed of only the introducer 4 as shown in FIG. 4 and opposed to the guide there is provided only the opposed guide 7 with no guide plate nor limiter in particular but having a piece of sponge 16 as the pressing member.

EMBODIMENT 3

Figure 5:
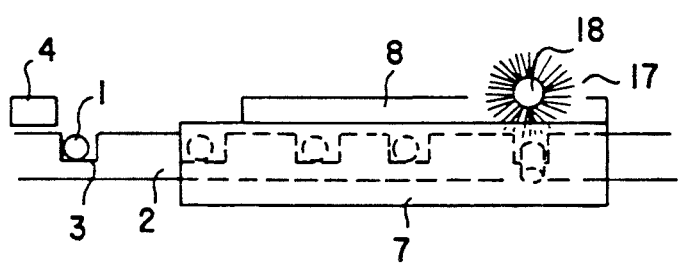
FIG. 5 is a principal front view of the embodiments shown in the above views except FIGS. 1 and 4.

As shown in FIG. 5 there is provided a rotary brush 17 as the pressing member.

EMBODIMENT 4

Figure 6:
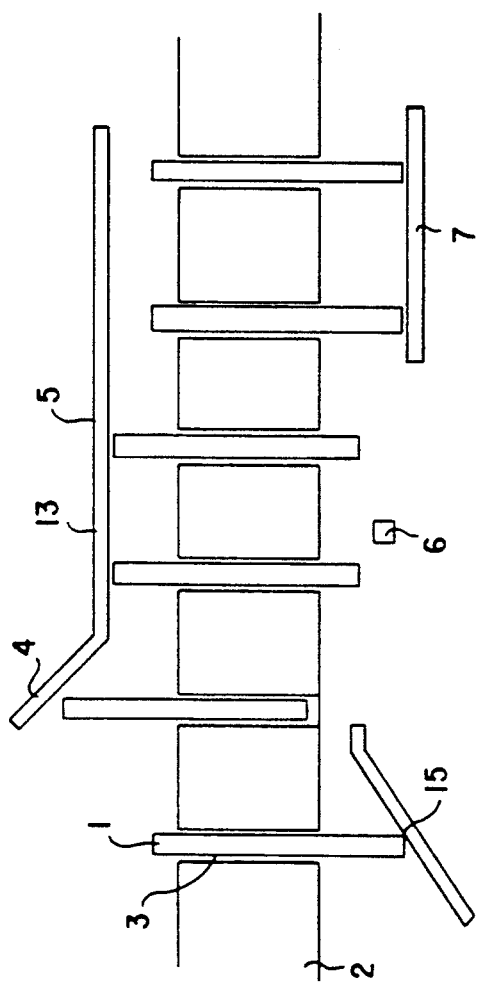
FIG. 6 is a principal plan view of the embodiments shown in the above views except FIGS. 1, 4 and 5.

As shown in FIG. 6 there are arranged the guide plate 15, limiter 6 and opposed guide 7 separately.

EMBODIMENT 5

Figure 7:
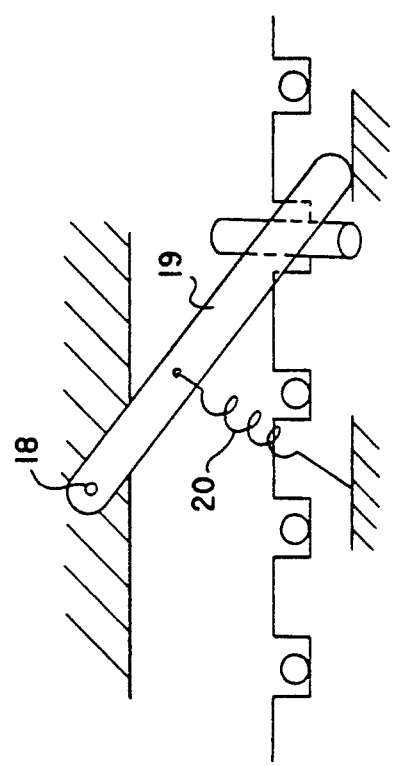
FIG. 7 is a principal front view of the embodiments shown in the above views except FIGS. 1, 4, 5 and 6.

As shown in FIG. 7, it is so arranged that the stick is pressed out of the groove by the use of the pressing member with elastic and repulsive force imparted by means of a spring 20.

EFFECT

Sticks too long are trimmed to the predetermined length, hence the loss in quantity of the sticks can be minimized. The selecting mechanism of the device is simple and can well withstand the high speed operation, and the device can satisfy the various requirements in bakery or confectionery manufacture.

What is claimed is:

1. Device for making the linear dimension of a plurality of sticks substantially uniform, comprising
   conveyor means (12) having a plurality of grooves (3) therein disposed equidistant from each other and perpendicular to direction of travel of the conveyor means, said grooves having substantially the same depth and being of a cross-section suitable for holding said sticks;
   first guide means (4) for urging said sticks placed in said grooves toward a substantially uniform distance from an edge of said conveyor means;
   second guide means (7,13) disposed substantially parallel to said conveyor means and between which said sticks held in said grooves travel with said conveyor means;
   trimming means (6) for trimming one end of said sticks which is greater in linear dimension than desired, as the conveyor means moves the sticks;
   first moving means (8,9) for causing the sticks, after the trimming operation, to be moved against one of said second guide means, and
   second moving means (10,16,18,19,20,17) for causing one end of said sticks held against said one of said second guide means, to be moved downward so that the stick is moved out of said groove holding said stick.

2. The device of claim 1, wherein said trimming means (6) is attached to one of said second guide means (5,7) and is located close to said first guide means (4).

3. The device of claim 1, wherein the first and second guide means are connected to each other.

4. The device of claim 1, wherein the first moving means comprises means for blowing air against the sticks held in said grooves, and means (8) attached to one of said second guide means for movably holding the sticks while the air moves the stick horizontally.

5. The device of claim 1, wherein the second moving means comprises means (10) for blowing air vertically downward to move the sticks out of the grooves.

6. The device of claim 1, wherein said second moving means comprises sponge means.

7. The device of claim 1, wherein said second moving means comprises rotary brush means (17).

8. The device of claim 1, wherein said second moving means comprises lever means (19,20).

* * * * *